May 4, 1965  K. R. WOOLLEY ETAL  3,182,233
MOUNTING FOR VIBRATORY REED DEVICES
Filed May 8, 1964
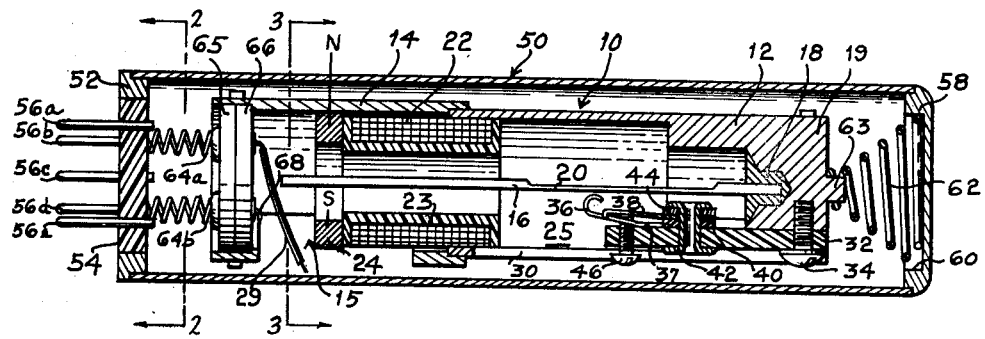
FIG. 1
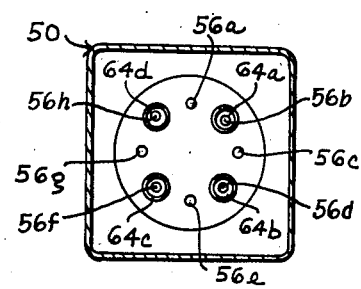
FIG. 2
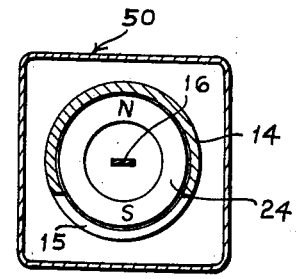
FIG. 3
INVENTOR.
KENNETH R. WOOLLEY
LARRY L. QUIGLEY
BY
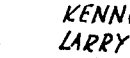
HIS ATTORNEYS

United States Patent Office 3,182,233
Patented May 4, 1965

---

3,182,233
MOUNTING FOR VIBRATORY REED DEVICES
Kenneth R. Woolley, Xenia, and Larry L. Quigley, Piqua, Ohio, assignors to Ledex, Inc., Dayton, Ohio, a corporation of Ohio
Filed May 8, 1964, Ser. No. 366,095
10 Claims. (Cl. 317—182)

This invention relates to an improved mounting for vibratory reed devices and more particularly to a mounting capable of isolating cantilever supported vibratory reeds from external shock and vibration; however, the invention is not necessarily so limited.

Resonant reed devices of the type improved by the present invention typically comprise a ferro magnetic reed element supported in a varying magnetic field produced by a solenoid coil surrounding the reed or otherwise in close proximity to the reed. In one type of operation means such as a conductor located in the vibratory path of the reed is employed to sense vibratory movements of the reed so as to relay such information to a responsive circuit. A reed element operated in association with such sensor is commonly named a reed relay or decoder.

In another type of operation the coil which is mounted in proximity to the reed element is an inductance element of an oscillator circuit having an uncontrolled frequency which wanders in the vicinity of the natural frequency of the vibratory reed. Vibration of the reed at its natural frequency induced by the oscillator circuit creates a variable reluctance associated with the coil, the reluctance varying at a natural frequency of vibration of the reed. The constant frequency of reluctance variation controls the oscillator frequency so as to cause the oscillator to oscillate at the same frequency as the natural reed frequency. In such operation the reed unit is commonly named an oscillator stabilizer.

In still another type of operation the reed, coil, and magnet may be used as the generator of a signal of prescribed frequency. For such operation the reed is set into vibration by a deflection thereof so as to disturb the magnetic flux pattern established about and in the reed by the magnet, and thereby induce a signal of varying voltage in the solenoid coil located adjacent the reed. In such operation the reed unit is commonly named an encoder.

The principal value of the vibratory reed in each of the preceding operations resides in its ability to vibrate at a fixed frequency which frequency can be adjusted to a desired value by making adjustments in the length, mass, resiliency and other structural properties of the reed, and which, once adjusted, remains constant over a wide range of environmental conditions.

For high fidelity reed operation a proper mounting for the reed is essential. In almost any operating environment for the reed, it can be expected that the reed will be subjected to external vibratory influences. For greatest fidelity a properly designed mounting which can isolate the reed from such external vibratory influences is required. Also in numerous applications for the reed, the reed will be subjected to accelerations which vary both in magnitude and direction and it is found that, with proper design of the reed mounting, the effects of such unavoidable variations in acceleration can be minimized.

An object of the present invention is to provide an improved mounting assembly for vibratory reed devices.

Another object of the present invention is to provide an improved mounting for vibratory reed devices characterized by an ability to isolate the reed device from varying acceleration loads in all directions and over a wide range of magnitudes.

Still another object of the present invention is to provide an improved mounting assembly for vibratory reeds characterized by thermally stable resilient mounting elements.

Still another object of the present invention is to provide an improved vibratory reed mounting assembly suitable for use with equal efficiency in supporting reed encoders, reed decoders, and reed oscillator stabilizers.

Other objects and advantages reside in the construction of parts, the combination thereof, the method of manufacture and the mode of operation, as will become more apparent from the following description.

In the drawing, FIGURE 1, is a longitudinal sectional view of a reed relay or decoder unit embodying the present invention.

FIGURE 2 is a transverse sectional view taken substantially along the line 2—2 of FIGURE 1.

FIGURE 3 is a transverse sectional view taken substantially along the line 3—3 of FIGURE 1.

Referring to the drawing in greater detail the reed relay unit illustrated therein is identified by the reference numeral 10 and comprises a generally cylindrical supporting base 12 of nonmagnetic material having fixedly attached thereto a tubular extension 14 having an axially disposed window 15 therein. The extension 14 can be but is not necessarily of ferromagnetic material. The base 12 supports an elongated axially disposed reed 16, fixedly attached to the interior of the base 12 and at one end thereof by brazing or soldering as indicated at 18. For reasons which will become more apparent in the following description, the end 19 of the base 12 to which the reed is attached is preferably massive compared to the opposite end of the base 12 and compared to the reed 16.

As best appears in FIGURE 3 the reed 16 has a rectangular cross section and may be undercut along a broad side thereof as shown at 20, for the purpose of adjusting its natural vibration frequency to a desired value.

Adjacent its free or unsupported end, the reed 16 is surrounded by a solenoid coil 22 which is protected by an insulating sheath 23. The coil 22 is supported at a fixed axial position along the length of the reed by snug frictional engagement with an interior wall 25 of the base 12.

Positioned adjacent the coil 22 in surrounding relation to the free end of the reed 16 is an annular permanent magnet element 24. The magnet element 24 is supported at desired axial and rotary positions along the length of the reed 16 by having a snug frictional engagement with the interior wall of the extension 14. Minor adjustments in the position of the magnet relative to the reed can be made in the finally assembled relay assembly through the window 15 which is located in the extension 14.

The magnet 24 is polarized diametrically and is so positioned in the relay assembly that the diametric axis of polarization for the magnet 24 is perpendicular to the broad sides of the reed 16. Thus a north magnetic pole is located opposite one of the broad sides of the reed 16 a south magnetic pole is located opposite the other broad side of the reed 16.

For sensing movements of the reed, an elongated slot 30 is cut axially into the base 12 and an insulating plate 32 is secured in said slot by means of the threaded fastener 34. Secured to the face of the plate 32 which confronts the reed 16 is a conductive wire contact 36 and a resilient control plate 38. The wire contact 36 and control plate 38 are spaced by a washer 40 and the control plate 38 is spaced from a securing rivet 42 by a conductive washer 44, the rivet passing through the plate 32. The wire contact 36 has an angular bend 37 therein and as the result of such bend the free end of the contact presses upwardly against the control plate 38, as viewed in FIGURE 1. The control plate 38 comprises a resilient spring metal biased against the insulating plate 32. The control plate is positioned to a desired degree of flexure away from the plate 32 by an adjusting screw 46 threaded into the supporting plate 32. By adjustment of the screw 46 the control plate 38 may be moved toward or away from the reed 16 so as to adjust the wire contact 36 to any desired separation from the reed 16.

In the operation of the reed unit illustrated an input signal of varying voltage is impressed upon the coil 22. The voltage signal impressed upon the coil 22 induces a variable magnetic field surrounding the coil and for which the reed 16 provides an axial flux path. Since the impressed signal comprises a varying or alternating voltage, the free end of the reed is alternately polarized as a north and a south magnetic pole. When the reed is polarized as a north pole, it is drawn toward the south pole of the magnet and when the reed is polarized as a south pole, it is drawn toward the north pole of the magnet. If the frequency of the alternating voltage applied to the coil 22 matches a natural frequency of vibration of the reed 16, a condition of resonance occurs in which the reed 16 vibrates at large amplitude. The spring wire contact 36 is so positioned that it contacts the reed and thereby senses a condition of resonance only when the reed vibrates with large amplitude.

During conditions of resonance, that is, when the reed is vibrating at large amplitude, that end of the reed which is fixed to the base 12 reacts against the base 12 in such manner as to induce a reactive vibration of the base 12. More specifically the reaction between the reed 16 and the base 12 is such that the reed 16 applies a torque to the base 12 about an axis passing through the soldered connection 18 in a direction parallel to the broad sides of the reed 16. If the base 12 is properly mounted such that it is free to oscillate as a reaction to the reed 16, the reed and the base 12 will vibrate together in the manner of the two tines of a tuning fork. Since the base 12 has an effective mass substantially larger than the mass of the reed its amplitude of vibration will be smaller, however, its frequency will match that of the reed. By using a massive base 12 the tuning fork action is permitted to take place without substantial reduction in the amplitude of reed vibration.

A proper mounting for the reed unit is one which does not obstruct the tuning fork action. In addition, the mounting must be such that a condition of resonance between the mounting and the base 12 does not develop. If a condition of resonance between the base 12 and its mounting should develop a substantial portion of the energy imparted to the reed by the signal impressed upon the coil will be absorbed in the mounting with the result that the vibration of the reed will be significantly damped.

A mounting having the requisite characteristics is illustrated in FIGURES 1, 2, and 3. This mounting comprises a protective housing or can 500 which may be of primarily metallic construction. The housing 50 is closed at one end by a metallic end member 52 having an insulating insert 54 therein. The insert 54 receives and supports conductive pins which are arranged in the form of an octal base such as provided on electron tubes. Pins 56a, 56b, 56c, 56d, 56e, 56f, 56g and 56h appear in FIGURE 2.

The opposite end of the housing 50 is enclosed by an end member 58 having an interiorly disposed cylindrical recess 60. Spring means engaging the opposite end members of the housing 50 suspend the relay unit, including the base 12 and its extension 14, therebetween.

Adjacent the end member 58 the suspending spring means comprises a conically coiled metallic spring 62. The base of the spring 62 has a substantially circular perimeter which fits accurately within the confines of the recess 60 in the end member 58. From the base of the spring 62 the spring converges to a smallest diameter convolution which surrounds and snugly fits a cylindrical projection 63 formed on the base 12 of the reed unit. The projection 63 is substantially coaxial with the axis of the reed 16, and the conically coiled spring 62 in its relaxed position is also substantially coaxial with the reed 16.

At the opposite end of the housing 50 there are provided four cylindrically coiled springs identified by the reference characters 64a, 64b, 64c and 64d. Each of these springs engages and forms a conductive path to one of the pins located in the octal base for the housing 50. Thus the spring 64a engages pin 56b and the spring 64b engages pin 56d. Springs 64c and 64d which are cut away by the sectioning in FIGURE 1 engage the pins previously noted as not appearing in the drawing.

The springs 64a, 64b, 64c and 64d engage in suitable receiving apertures located in insulating discs 65 and 66 which are seated in the end of the extension 14 to the base 12 of the reed unit. The springs 64a, 64b, 64c and 64d each have their longitudinal axis parallel to the reed 16 and as clearly appears in FIGURE 2 are symmetrically mounted such that they are equally spaced from one another and from the axis of the reed 16. The dimensions of the mounting springs 62 and 64a, 64b, 64c and 64d are such that upon assembly of the reed unit in its housing 50 the several springs all are under compression, the direction of stress or compression being parallel to the axis of the reed 16.

For operation of the reed unit, the terminals of the solenoid 22 are connected conductively to two of the cylindrically coiled springs, such as the springs 64c and 64d, by suitable conductors not shown, so that a signal may be impressed upon the coil 22 through the pins in the octal base associated with such springs. By means of a conductor 29 which is only partially illustrated in the drawing, the rivet 42 and accordingly the wire contact 38 is engaged conductively with the spring 64a, and the pin 56b associated therewith. By means of another conductor 68, the reed, the base 12, and its extension 14 are connected conductively with the spring 64b and the pin 56d associated therewith. Thus upon vibration of the reed 16 at an amplitude sufficient to engage the wire contact 36, alternate shorting across the pins 56b and 56d occurs, this condition of alternate shorting signifying a condition of resonant vibration of the reed 16.

As previously described, the base 12 and reed 16 vibrate in the manner of a tuning fork at those times when the reed 16 is in resonance with a signal impressed on the coil 22. At such times the left end of the base 12, as viewed in FIGURE 1, together with the extension 14 attached thereto strives to move in the manner of a pendulum about an axis extending parallel to the broad sides of the reed 16 and passing adjacent the soldered connection 18. The actual swing of the extension 14 is of course small due to the relatively high mass associated with the base 12 and its extension 14, the primary effect on the springs 64a, 64b, 64c, and 64d being that these springs are subjected to alternate oppositely directed lateral thrusts. The principal function of the spring 64 is to yield to such thrusts in a uniform manner in all gravitational orientations while preventing physical contact between the base 12 and housing 50. To promote this uniform response it is preferred that the base 12, its extension 14, the coil 22, and the magnet 24 be all centered such that the centers of mass of these elements are located in or adjacent the reed 16.

Since the primary movements of the base 12 and its extension 14 occur at the left end thereof, as viewed in FIGURE 1, the conical spring 62 at the opposite end receives only a minor reaction due to a resonant vibration of the reed 16.

The principal function of the spring 62 is to maintain a substantially central position of the base 12 in the housing 50 while at the same time decoupling the base 12 from the housing in a manner that avoids resonance between the spring 62 and the reed 16.

The spring 62 is uniquely suited for the performance of its function in that the conical configuration thereof produces a substantially uniform restoring force for all movements of the base 12 inside the housing 50. At the same time, there is adequate strength in the spring 62 to support the base 12 away from the side walls of the housing 50 in all orientations of the reed unit in the earth's gravitational field. Due to its conical configuration, the spring affords ample freedom for the relatively minor vibrations of the heavy end of the base 12 and therefore effectively decouples this end of the base 12 from the housing.

By employing the conical spring 62 as illustrated, it is found that the resonant frequency characteristic of the reed unit is remarkably constant for all orientations of the reed unit with respect to a gravitational force and that in all such orientations a constant frequency can be maintained under a wide variety of disturbances such as external vibration or shock.

It will be recognized by those skilled in the art that the reed unit suspended by the springs 62 and 64 has a resonant frequency with respect to the housing 50. For optimum operation of the device illustrated it is important that the reasonant frequency of the suspended reed unit as a whole be different from the resonant frequency of the reed and any harmonics thereof. To insure this difference, it is preferred that the springs 62 and 64 at the opposite ends of the reed unit be so constructed that the resonant frequency of the mounting is less than 40% of the resonant frequency of the reed 16.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. An assembly for mounting an elongate reed element for vibration thereof comprising: support means for said reed element, said support means having spaced end members, said reed element being supported at one end thereof by one of said end members and having its free end projecting toward the other of said end members, an outer frame having spaced end walls receiving said end members therebetween, first spring means interposed between and engaging said one end member and one end wall of said outer frame, second spring means interposed between and engaging said other end member and the other end wall of said outer frame, said first and second spring means being normally in a condition of stress and thereby suspending said support means away from contact with said outer frame, said first and second spring means comprising the sole means suspending said support means away from contact with said frame, said first spring means comprising an elongate body portion having large and small bases at the opposite ends thereof, the large base of said body portion engaging said one end wall substantially continuously along the outer perimeter thereof and said body portion converging in the direction of said small base, said small base engaging said one end member, and means to restrain movement of said small base relative to said one end member in directions transverse to the longitudinal axis of said reed element.

2. An assembly for mounting an elongate reed element for vibration thereof comprising: support means for said reed element, said support means having spaced end members, said reed element being supported at one end thereof by one of said members and having its free end projecting toward the other of said end members, an outer frame having spaced end walls receiving said end members therebetween, first spring means interposed between and engaging said one end member and one end wall of said outer frame, second spring means interposed between and engaging said other end member and the other end wall of said frame, said first and second spring means being normally in a condition of stress and thereby suspending said support means away from contact with said outer frame, said first and second spring means comprising the sole means suspending said support means away from contact with said frame, the direction of stress being substantially parallel to the longitudinal axis of said reed element, said first spring means comprising an elongate body portion having large and small bases at the opposite ends thereof, the large base of said body portion having a circular outer periphery and engaging said one end wall substantially continuously along the outer periphery thereof, and said body portion converging in the direction of said small base, said small base engaging said one end member, and means to restrain movement of said small base relative to said one end member in directions transverse to the longitudinal axis of said reed element.

3. An assembly for mounting an elongate reed element for vibration thereof comprising: support means for said reed element, said support means having spaced end members, said reed element being supported at one end thereof by one of said end members and having its free end projecting toward the other of said end members, an outer frame having spaced end walls receiving said end members therebetween, first spring means interposed between and engaging said one end member and one end wall of said outer frame, second spring means interposed between and engaging said other end member and the other end wall of said outer frame, said first and second spring means being normally in a condition of stress and thereby suspending said support means away from contact with said outer frame, said first and second spring means comprising the sole means suspending said support means away from contact with said frame, the direction of stress being substantially parallel to the longitudinal axis of said reed, said first spring means comprising a body portion having a conically shaped exterior configuration coaxial with the longitudinal axis of said reed element, the base of said body portion engaging said one end wall substantially continuously along the outer perimeter thereof and said body portion converging in the direction of said one end member, and means to restrain relative movement between said one end member and said body portion in directions transverse to the longitudinal axis of said reed element.

4. The assembly of claim 3 wherein said first spring means comprises a helically coiled spring the convolutions of which have successively smaller diameters, the largest diameter convolution thereof engaging said one end wall and the smallest diameter convolution thereof engaging said one end member.

5. The assembly of claim 4 wherein said second spring means comprises a plurality of coiled spring elements interposed between said second end member and said second end wall, said coiled springs having cylindrical outer peripheries and being disposed with their axes parallel to the longitudinal axis of said reed element.

6. The assembly of claim 5 including an operating coil supported by said support means in encircling relation to said reed element, and conductor means connecting the opposite ends of said coil to separate ones of said springs in said second spring means, said separate ones of said springs constituting current carriers for conducting electrical current to and from said coil.

7. A resonant reed assembly comprising an inner frame and an outer housing, said inner frame comprising two end members and means supporting said end members in spaced confronting relation, an elongated reed of greater width than thickness fixed at one end thereof to a first of said end members and having its free end projecting toward but not touching the second of said end members, an operating coil supported by said frame in surrounding relation to said reed, a permanet magnet having north and south poles defining a magnetic axis therefor, said frame supporting said magnet adjacent said reed with said magnetic axis directed substantially normal to the wider sides of said reed, said outer housing having spaced confronting wall portions, said inner frame being disposed between said wall portions with said reed projecting substantially normal thereto whereby said first end member of said frame opposes a first of said wall portions and the second end member of said frame opposes the second of said wall portions, first resilient means interposed between and contacting said second end member and said second wall portion, a compression spring coiled about an axis substantially coincident with the axis of said reed interposed between and engaged at its opposite ends to said first end member and said first wall portion, means restraining relative movement between said first end member and said spring engaged therewith in directions transverse to the longitudinal axis of said reed, said compression spring separating said frame from said one wall portion and biasing said frame toward said first resilient means whereby both said spring and said first resilient means are compressed and cooperate to suspend said frame away from contact with said housing, said resilient means and said compression spring comprising the sole means suspending said frame away from contact with said housing, said spring having a convergent portion therein wherein successive convolutions thereof approaching said first end member have successively smaller diameters, the smallest convolution of said convergent portion constituting the smallest diameter convolution in said spring, and conductor means passing through said housing and into said frame connected to said coil for conducting electrical energy thereto.

8. The assembly according to claim 7 wherein said frame comprises a cylindrical inner housing concentric with said reed and having a center of mass disposed substantially on the longitudinal axis of said reed, and said coil has a center of mass disposed substantially at the longitudinal axis of said reed.

9. The assembly according to claim 8 wherein said spring is a conical spring the base of which is fixed with respect to said first wall portion and has a diameter equal substantially to that of said inner housing, said smallest diameter convolution of said spring centrally engaging said first end plate.

10. The assembly according to claim 7 wherein said first resilient means comprises four coil springs of cylindrical configuration, said springs being disposed in axially parallel relation, each spaced equally from the longitudinal axis of said inner housing, and each disposed at equi-angular intervals about said longitudinal axis of said reed.

References Cited by the Examiner
UNITED STATES PATENTS

| | | | |
|---|---|---|---|
| 2,289,514 | 7/42 | Mastney et al. | |
| 2,498,042 | 2/50 | Kolber | 206—46 |
| 2,581,416 | 1/52 | Irby et al. | 248—358 |
| 2,688,059 | 8/54 | Holzinger et al. | 200—91 |
| 2,777,950 | 1/57 | Doremus | 331—156 X |

FOREIGN PATENTS

| | | |
|---|---|---|
| 871,210 | 2/35 | France. |
| 412,792 | 4/35 | Germany. |
| 525,507 | 5/31 | Germany. |

LARAMIE E. ASKIN, *Primary Examiner.*